(12) United States Patent
Guo

(10) Patent No.: US 11,476,765 B2
(45) Date of Patent: Oct. 18, 2022

(54) MULTI-PORT BUCK-BOOST CONVERTER AND METHOD OF CONTROL

(71) Applicant: OTIS ELEVATOR COMPANY, Farmington, CT (US)

(72) Inventor: Ben Guo, West Hartford, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 45 days.

(21) Appl. No.: 17/122,274

(22) Filed: Dec. 15, 2020

(65) Prior Publication Data

US 2022/0190723 A1 Jun. 16, 2022

(51) Int. Cl.
  *H02M 3/158* (2006.01)
  *H02M 1/00* (2006.01)
  *H02M 1/08* (2006.01)
  *H02M 1/32* (2007.01)
  *H02M 1/36* (2007.01)

(52) U.S. Cl.
  CPC ......... *H02M 3/1582* (2013.01); *H02M 1/009* (2021.05); *H02M 1/08* (2013.01); *H02M 1/32* (2013.01); *H02M 1/36* (2013.01); *H02M 3/1584* (2013.01); *H02M 1/0009* (2021.05)

(58) Field of Classification Search
  CPC ... H02M 3/1582; H02M 3/1584; H02M 1/009
  See application file for complete search history.

(56) References Cited

U.S. PATENT DOCUMENTS

| | | | |
|---|---|---|---|
| 9,172,303 B2* | 10/2015 | Vasadi | H02M 3/158 |
| 2010/0194344 A1* | 8/2010 | Greyling | H02M 3/157 320/128 |
| 2017/0126146 A1* | 5/2017 | Petersen | H02M 3/158 |
| 2017/0271990 A1* | 9/2017 | Knoedgen | H02M 3/158 |

* cited by examiner

*Primary Examiner* — Kyle J Moody
*Assistant Examiner* — Jye-June Lee
(74) *Attorney, Agent, or Firm* — Carlson, Gaskey & Olds, P.C.

(57) ABSTRACT

An illustrative example embodiment of a buck-boost converter includes at least three input/output ports, at least three sets of switches, and at least two ripple current limiters. One of the sets of switches is associated with each of the input/output ports. Each of the ripple current limiters is associated with a respective one of the sets of switches between the associated set of switches and another one of the sets of switches.

15 Claims, 2 Drawing Sheets

MULTI-PORT BUCK-BOOST CONVERTER AND METHOD OF CONTROL

BACKGROUND

Buck-boost converters are useful for controlling the amount of power delivered to a load. For example, buck-boost DC-DC converters are useful to either step up or step down an input voltage. When a voltage supply is too high for a load, the converter steps down the voltage to the load. Alternatively, when a power supply is unable to provide a needed voltage, the converter can boost the output to the load. Both types of adjustment may be used at different times to meet the needs of a variety of situations.

Buck-boost converters have proven useful for adjustable control over the charging profile of batteries, as an interface in hybrid energy storage systems, and in power supply arrangements that include a wide range of input and output voltage. While they have proven useful, buck-boost converters are not without limitations. Traditional buck-boost converters have only one input port and one input/output port with switches between them. Multiple converters are needed in situations where there are multiple loads, for example, which increases system cost. Another drawback is that the switch control in many buck-boosters tends to introduce additional ripple current, which requires more robust and more expensive components.

SUMMARY

An illustrative example embodiment of a buck-boost converter includes at least three input/output ports, at least three sets of switches, and at least two ripple current limiters. One of the sets of switches is associated with each of the input/output ports. Each of the ripple current limiters is associated with a respective one of the sets of switches between the associated set of switches and another one of the sets of switches.

In addition to one or more of the features described above, or as an alternative, a first one of the ripple current limiters is associated with a one of the input/output ports, a second one of the ripple current limiters is associated with another one of the input/output ports, and the first one of the ripple current limiters is connected in series with the second one of the ripple current limiters.

In addition to one or more of the features described above, or as an alternative, the first one of the ripple current limiters comprises an inductor and the second one of the ripple current limiters comprises an inductor.

In addition to one or more of the features described above, or as an alternative, a first one of the ripple current limiters is associated with t one of the input/output ports, a second one of the ripple current limiters is associated with another one of the input/output ports, and the first one of the ripple current limiters is connected in parallel with the second one of the ripple current limiters.

In addition to one or more of the features described above, or as an alternative, the first one of the ripple current limiters comprises an inductor and the second one of the ripple current limiters comprises an inductor.

In addition to one or more of the features described above, or as an alternative, each of the ripple current limiters comprises an inductor.

In addition to one or more of the features described above, or as an alternative, the set of switches associated with a first input/output port includes a first switch and a second switch with a first switch connector coupling one side of the first switch to one side of the second switch, the set of switches associated with a second input/output port includes a third switch and a fourth switch with a second switch connector coupling one side of the third switch to one side of the fourth switch, the set of switches associated with a third input/output port includes a fifth switch and a sixth switch with a third switch connector coupling one side of the fifth switch to one side of the sixth switch, a first one of the ripple current limiters is connected between the first switch connector and the second switch connector, and a second one of the ripple current limiters is connected between the first switch connector and the third switch connector.

In addition to one or more of the features described above, or as an alternative, the first one of the ripple current limiters is connected in series with the second one of the ripple current limiters.

In addition to one or more of the features described above, or as an alternative, the first one of the ripple current limiters is in parallel with the second one of the ripple current limiters.

In addition to one or more of the features described above, or as an alternative, the buck-boost converter includes a controller that controls operation of the switches, the first switch has one side connected to a positive terminal of the first input/output port, the second switch has one side connected to a negative terminal of the first input/output port, the third switch has one side connected to a positive terminal of the second input/output port, the fourth switch has one side connected to a negative terminal of the second input/output ports, the controller selectively provides a switch activation signal to the switches, the switch activation signal provided to the first switch is synchronized with the switch activation signal provided to the third switch, and a phase of the switch activation signal provided to the first switch is the same as a phase of the switch activation signal provided to the third switch during at least a majority of a cycle.

In addition to one or more of the features described above, or as an alternative, a phase of the switch activation signal provided to the second switch is the same as a phase of the switch activation signal provided to the fourth switch during at least a majority of a cycle.

An illustrative example embodiment of a method of controlling a buck-boost converter having at least three input/output ports and at least two associated ripple current limiters with each of the input/output ports having a plurality of associated switches, includes: providing synchronized switch activation signals to the switches that have one side connected to a positive terminal of the associated input/output port, the synchronized switch activation signals having the same phase over at least a majority of a cycle; and providing other synchronized switch activation signals to the switches that have one side connected to a negative terminal of the associated input/output port, the other synchronized switch activation signals having the same phase over at least a majority of the cycle.

In addition to one or more of the features described above, or as an alternative, the synchronized switch activation signals have a first phase during a portion of the cycle and the other synchronized switch activation signals have a second, opposite phase during the portion of the cycle.

In addition to one or more of the features described above, or as an alternative, the ripple current limiters each comprise an inductor.

In addition to one or more of the features described above, or as an alternative, the method includes selectively controlling the switches to deliver power from a first one of the input/output ports to a second one of the input/output ports during at least one time period and to deliver power from the second one of the input/output ports to the first one of the input/output ports during at least one other time period.

The various features and advantages of at least one disclosed example embodiment will become apparent to those skilled in the art from the following detailed description. The drawings that accompany the detailed description can be briefly described as follows.

DETAILED DESCRIPTION

Figure 1:
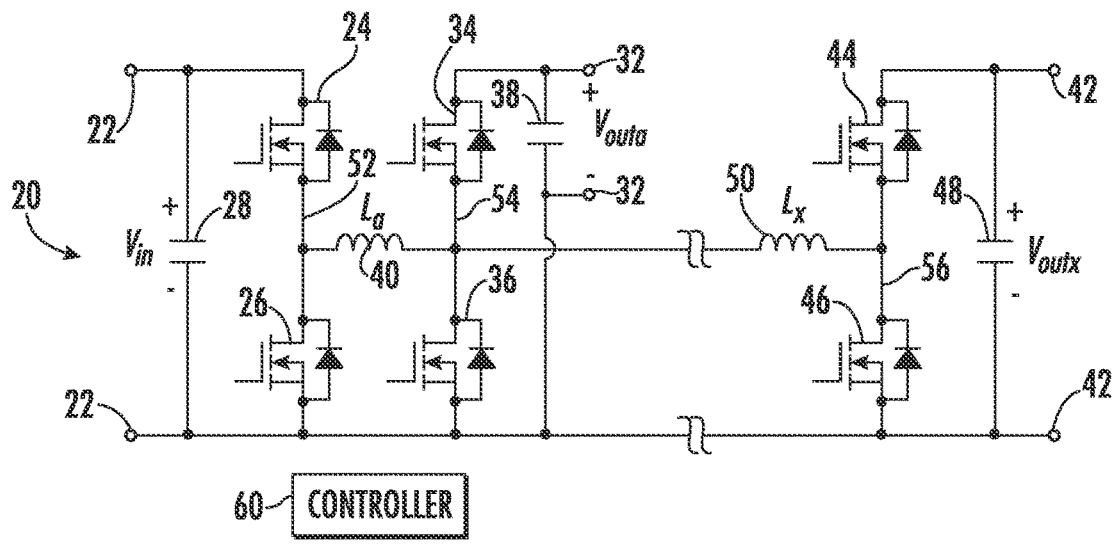
FIG. 1 schematically illustrates a buck-boost converter configuration including at least three input/output ports and a ripple current limiter associated with each input/output port.

FIG. 1 schematically illustrates an example embodiment of a buck-boost converter 20 that includes at least three input/output ports. A first input/output port 22 is configured to be connected with a power source when the first input/output port 22 serves as an input port or with a load when the first input/output port 22 serves as an output port. A first set of switches, including a first switch 24 and a second switch 26, is associated with the first input/output port 22. A first capacitor 28 is in parallel with the switches 24, 26 in this embodiment.

A second input/output port 32 is configured to be connected with a load when serving as an output port or with a power source when serving as an input port. A second set of switches includes a third switch 34 and a fourth switch 36 associated with the input/output port 32. A capacitor 38, which operates in a known manner, is associated with the input/output port 32.

A first ripple current limiter 40 is associated with the second set of switches 34, 36. The ripple current limiter 40 comprises an inductor in this embodiment. The ripple current limiter 40 decouples the input/output port 32 from the input/output port 22 and the components associated with the input/output port 22, such as the switches 24, 26 and the capacitor 28. The inductor of the ripple current limiter 40 also serves other known functions, such as storing electrical energy while the capacitor 38 discharges to deliver power at the input/output port 32 or releasing stored energy to charge the capacitor 38.

A third input/output port 42 is configured to be connected to another load when serving as an output port or a power source when serving as an input port. A third set of switches, including a fifth switch 44 and a sixth switch 46, is associated with the third input/output port 42. A capacitor 48 provides electrical energy to the third input/output port 42 when needed.

A second ripple current limiter 50 is associated with the third set of switches 44, 46 to at least decouple the input/output port 42 from the input/output port 22 and the components associated with the input/output port 22. The second ripple current limiter 50 comprises at least an inductor.

A first switch connector 52 connects one side of the first switch 24 to one side of the second switch 26. A second switch connector 54 connects one side of the third switch 34 to one side of the fourth switch 36. A third switch connector 56 connects one side of the fifth switch 44 to one side of the sixth switch 46.

The ripple current limiters 40 and 50 are connected in series in the embodiment of FIG. 1. The first ripple current limiter 40 is connected to the first switch connector 52 between the switches 24, 26 and to the second switch connector 54 between the switches 34, 36. The second ripple current limiter 50 is connected to the third switch connector 56 between the switches 44, 46 and to the second switch connector 54 in series with the first ripple current limiter 40.

Each ripple current limiter 40, 50 operates to decouple the associated input/output port 32, 42 and their respective components from the rest of the buck-boost converter 20. Including a separate or dedicated ripple current limiter 40, 50 for each input/output port 32, 42 allows for including multiple input/output ports in the single buck-boost converter 20. While FIG. 1 shows three input/output ports 22, 32, 42, additional input/output ports and associated ripple current limiters can be included.

A controller 60 controls operation of the switches 24, 26, 34, 36 44, and 46 to achieve a desired conversion of the power or voltage of an input source coupled with at least one of the input/output ports 22, 32, 42, to deliver the converted power or voltage to at least one other port. The controller 60 is configured to control the switches independently so that a different output may be provided at each of the input/output ports that is serving as an output port. This allows for different loads with different power requirements to be powered through the single buck-boost converter 20.

The input/output ports are each configured to serve as an input port or an output port to meet the needs of a particular implementation or installation and the controller 60 is configured to control the switches in a manner that allows for bi-directional power delivery through the buck-boost converter 20.

For example, when a power source is coupled to the first input/output port 22 and loads are coupled to the input/output ports 32 and 42, the assembly includes an input port and two output ports. The switches 24 and 26 can be considered input switches, the switches 34, 36, 44, and 46 can be considered output switches. The ripple current limiters 40 and 50 are each associated with a respective one of the sets of output switches between the associated set of output switches and the input switches. Power delivery is in the direction from left to right according to FIG. 1. Alternatively, the input/output port 22 may be connected with a load and at least one of the input/output ports 32 or 42 may be connected with a power source. In that case, power delivery will be at least partially right to left in FIG. 1.

Additionally, the same buck-booster 20 may be used to deliver power from one of the ports to another during one time period and to deliver power in an opposite direction between those ports during another time period. This may be useful, for example, when a load includes an electric machine that draws current when operating as a motor and generates current when moving as a generator or operating in a regenerative mode. The controller 60 controls the switches associated with the corresponding input/output port to use that port as an output port and an input port, respectively, during those different conditions.

The controller 60 includes a computing device, such as a microprocessor, and memory that includes instructions that are executed by the controller 60 to achieve the desired converter operation. The manner in which switches of a buck-boost converter facilitate delivering a desired output, which may be stepped up or stepped down, is known to those skilled in the art and will not be described here.

Figure 2:
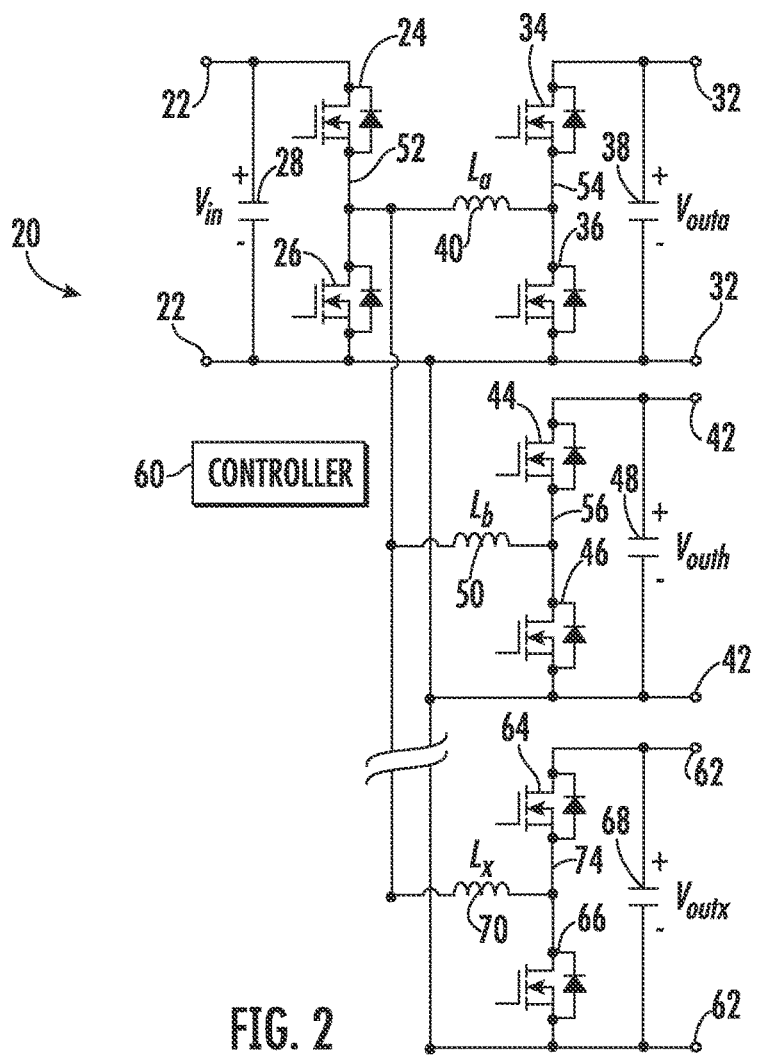
FIG. 2 schematically illustrates another buck-boost converter configuration.

FIG. 2 shows another configuration of a buck-boost converter 20. The illustration shows a fourth input/output port 62 in this example embodiment. The fourth input/output port 62 has a set of switches associated with it, including a seventh switch 64 and an eighth switch 66. Another capacitor 68 provides electrical energy at the fourth input/output port 62 under appropriate conditions.

A ripple current limiter 70, such as an inductor, decouples the fourth input/output port 62 and its associated components from other parts of the buck-boost converter 20. The ripple current limiter 70 is connected between the first switch connector 52 and a fourth switch connector 74. The controller 60 in this example is configured to control or operate the switches to achieve a desired transfer of power between selected ones of the ports 22, 32, 42 and 62.

The ripple current limiters 40, 50 and 70 in this example are in parallel with each other. A parallel circuit configuration may facilitate more easily accommodating additional ports compared to a series configuration. Additional ports with associated ripple current limiters may be placed in parallel with the illustrated ports. Another difference between the parallel configuration of the ripple current limiters in FIG. 2 compared to the series configuration in FIG. 1 is that the parallel configuration reduces losses to the different ports because current does not need to pass through any intermediate ripple current limiters between a selected set of the input/output ports 22, 32, 42, 62.

As in the previous example, it is possible to use any of the ports as an input or output by appropriately controlling the switches in this embodiment.

Figure 3:
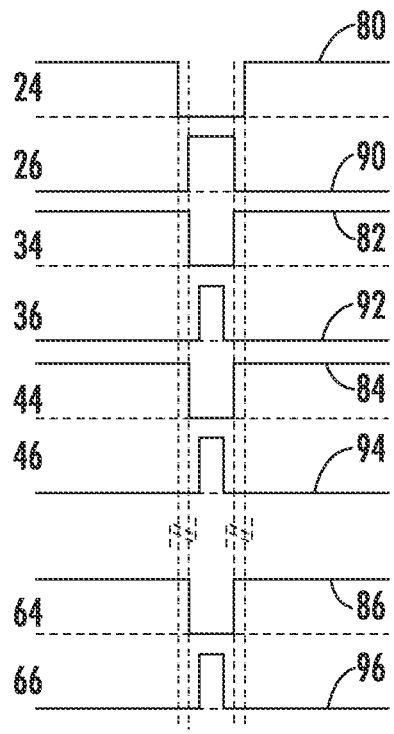
FIG. 3 schematically illustrates a control technique for activating switches of the buck-boost converter of FIG. 1 or 2.

The example controller 60 is configured to use a unique control strategy for controlling switch operation. FIG. 3 schematically shows control or activation signals that the controller provides to the switches including a control signal 80 for the first switch 24, a control signal 82 for the third switch 34, a control signal 84 for the fifth switch 44 and a control signal 86 for the seventh switch 64. One feature of the control signals 80, 82, 84 and 86 is that they have the same phase over a majority of a cycle. One cycle is shown in FIG. 3. For example, the times during which the control signals 82, 84 and 86 are low overlap with the time during which the control signal 80 is low. During those times, the signals all have the same phase.

The controller also provides a control signal 90 to the second switch 26, a control signal 92 to the fourth switch 36, a control signal 94 to the sixth switch 46 and a control signal 96 to the eighth switch 66. Those control signals all have the same phase over a majority of a cycle.

The switches 24, 34, 44, 64 between the respective ripple current limiters and the positive terminal of the associated ports all have control or activation signals that are synchronized to have the same phase over the majority of a cycle. Similarly, the switches 26, 36, 46, 66 between the respective ripple current limiters and the negative terminal of the associated ports all have control signals that are synchronized to have the same phase over the majority of a cycle. By maintaining the same phase of the control signals in this manner, the controller 60 reduces or minimizes ripple current in the buck-boost converter 20. Reducing or minimizing ripple current reduces the requirements of the inductors of the ripple current limiters allowing for less expensive components to be used. The control technique shown in FIG. 3, therefore, provides cost savings.

Figure 4:
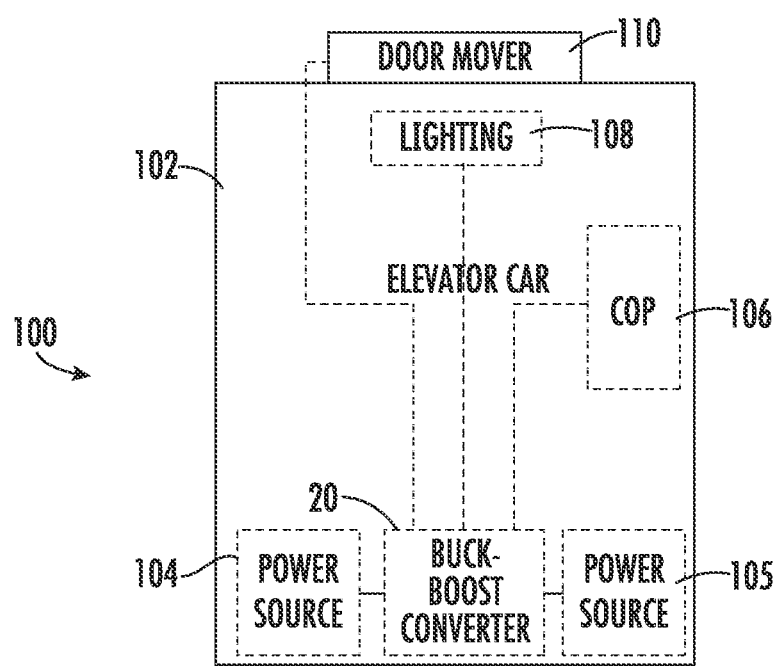
FIG. 4 schematically illustrates selected features of an elevator car including a buck-boost converter like that shown in FIG. 1 or 2.

Buck-boost converters 20 like those shown in the drawings and described above are useful in a variety of situations. One example implementation from an elevator system 100 is shown in FIG. 4. In this example, an elevator car 102 has onboard power sources 104 and 105 that may eliminate a need for a travelling cable to be connected with the elevator car 102. The buck-boost converter 20 in this example serves as an interface between the power sources 104 and 105 and a plurality of loads, each of which is coupled to a respective input/output port of the buck-booster converter 20. For example, the car operating panel (COP) 106, the elevator car lighting 108 and the door mover 110 all have different power requirements. A single buck-boost converter 20 including multiple input/output ports is controlled to supply those differing power levels to the loads 106-110.

With embodiments of a buck-boost converter consistent with this description, it is possible to reduce the number of converters needed to provide power to a plurality of different loads or to receive power from a plurality of different power sources. Reducing the required number of converters reduces cost. Embodiments that include a switch control strategy like that described above may present additional cost savings because the ripple current limiter components, such as inductors, can be less robust and less expensive.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A buck-boost converter, comprising:
   at least three input/output ports;
   at least three sets of switches, one of the sets of switches being associated with each of the input/output ports;
   at least two ripple current limiters, each of the ripple current limiters being associated with a respective one of the sets of switches between the respective one of the sets of switches and another one of the sets of switches; and
   a controller that controls operation of the switches by selectively
      providing synchronized switch activation signals to switches that have one side connected to a positive terminal of an associated input/output port, the synchronized switch activation signals having a same phase over at least a majority of a cycle; and
      providing other synchronized switch activation signals to switches that have one side connected to a negative terminal of an associated input/output port, the other synchronized switch activation signals having a same phase over at least a majority of the cycle.

2. The buck-boost converter of claim 1, wherein
   a first one of the ripple current limiters is associated with one of the input/output ports,
   a second one of the ripple current limiters is associated with another one of the input/output ports, and
   the first one of the ripple current limiters is connected in series with the second one of the ripple current limiters.

3. The buck-boost converter of claim 2, wherein the first one of the ripple current limiters comprises an inductor and the second one of the ripple current limiters comprises an inductor.

4. The buck-boost converter of claim 1, wherein
   a first one of the ripple current limiters is associated with one of the input/output ports, a second one of the ripple current limiters is associated with another one of the input/output ports, and the first one of the ripple current limiters is connected in parallel with the second one of the ripple current limiters.

5. The buck-boost converter of claim 4, wherein the first one of the ripple current limiters comprises an inductor and the second one of the ripple current limiters comprises an inductor.

6. The buck-boost converter of claim 1, wherein each of the ripple current limiters comprises an inductor.

7. The buck-boost converter of claim 1, wherein one of the sets of switches associated with a first input/output port includes a first switch and a second switch with a first switch connector coupling one side of the first switch to one side of the second switch, one of the sets of switches associated with a second input/output port includes a third switch and a fourth switch with a second switch connector coupling one side of the third switch to one side of the fourth switch, one of the sets of switches associated with a third input/output port includes a fifth switch and a sixth switch with a third switch connector coupling one side of the fifth switch to one side of the sixth switch, a first one of the ripple current limiters is connected between the first switch connector and the second switch connector, and a second one of the ripple current limiters is connected between the first switch connector and the third switch connector.

8. The buck-boost converter of claim 7, wherein the first one of the ripple current limiters is connected in series with the second one of the ripple current limiters.

9. The buck-boost converter of claim 7, wherein the first one of the ripple current limiters is in parallel with the second one of the ripple current limiters.

10. The buck-boost converter of claim 7, wherein:
the first switch has one side connected to a positive terminal of the first input/output port,
the second switch has one side connected to a negative terminal of the first input/output port,
the third switch has one side connected to a positive terminal of the second input/output port,
the fourth switch has one side connected to a negative terminal of the second input/output port,
the synchronized switch activation signals include a switch activation signal provided to the first switch that is synchronized with a switch activation signal provided to the third switch, and
a phase of the switch activation signal provided to the first switch is the same as a phase of the switch activation signal provided to the third switch during at least a majority of a cycle.

11. The assembly of claim 10, wherein a phase of the switch activation signal provided to the second switch is the same as a phase of the switch activation signal provided to the fourth switch during at least a majority of a cycle.

12. A method of controlling a buck-boost converter including at least three input/output ports and at least two associated ripple current limiters, each of the input/output ports having a plurality of associated switches, the method comprising:

providing synchronized switch activation signals to switches that have one side connected to a positive terminal of an associated input/output port, the synchronized switch activation signals having a same phase over at least a majority of a cycle; and providing other synchronized switch activation signals to switches that have one side connected to a negative terminal of an associated input/output port, the other synchronized switch activation signals having a same phase over at least a majority of the cycle.

13. The method of claim 12, wherein the synchronized switch activation signals have a first phase during a portion of the cycle and the other synchronized switch activation signals have a second, opposite phase during the portion of the cycle.

14. The method of claim 12, wherein the at least two associated ripple current limiters each comprise an inductor.

15. The method of claim 12, comprising selectively controlling the plurality of associated switches to deliver power from a first one of the input/output ports to a second one of the input/output ports during at least one time period and to deliver power from the second one of the input/output ports to the first one of the input/output ports during at least one other time period.

* * * * *